United States Patent [19]

Hakimi

[11] Patent Number: 4,850,668
[45] Date of Patent: Jul. 25, 1989

[54] GYROPTIC VISUAL COUPLERS

[76] Inventor: Hosain Hakimi, 131 Coolidge Ave. Unit 627, Watertown, Mass. 02172

[21] Appl. No.: 178,135

[22] Filed: Apr. 6, 1988

Related U.S. Application Data

[63] Continuation of Ser. No. 57,730, Jun. 2, 1987, abandoned, which is a continuation-in-part of Ser. No. 27,152, Mar. 17, 1987, abandoned.

[51] Int. Cl.$^4$ ............ G02B 6/36; H01J 5/16; G01B 11/26
[52] U.S. Cl. .............. 350/96.20; 350/96.10; 350/96.15; 350/96.17; 350/96.18; 250/484.1; 250/487.1; 250/227; 356/153; 356/154
[58] Field of Search ........... 350/96.10, 96.15, 96.17, 350/96.18, 96.20, 96.21, 320; 250/483.1, 484.1, 485.1, 486.1, 487.1, 488.1, 227; 356/153, 154, 391

[56] References Cited

U.S. PATENT DOCUMENTS

| | | | |
|---|---|---|---|
| 3,915,575 | 10/1975 | Sick | 356/154 X |
| 4,215,937 | 8/1980 | Borsuk | 356/73.1 |
| 4,265,511 | 5/1981 | Nicia et al. | 350/96.18 |
| 4,451,115 | 5/1984 | Nicia et al. | 350/96.18 |
| 4,475,788 | 10/1984 | Tomassini et al. | 350/96.20 |
| 4,542,956 | 9/1985 | McCrickerd | 350/96.20 |
| 4,613,214 | 9/1986 | Brugger et al. | 350/96.21 |
| 4,673,245 | 6/1987 | Kling et al. | 350/96.20 |
| 4,690,493 | 9/1987 | Khoe | 350/96.20 |
| 4,720,163 | 1/1988 | Goodwin et al. | 350/96.20 |
| 4,728,187 | 3/1988 | Dubroeucq et al. | 356/153 |
| 4,746,195 | 5/1988 | Auracher et al. | 350/320 |
| 4,770,485 | 9/1988 | Buckley et al. | 350/96.18 |
| 4,770,529 | 9/1988 | Levinson et al. | 356/153 |
| 4,799,756 | 1/1989 | Hirschfeld | 350/96.18 |

Primary Examiner—William L. Sikes
Assistant Examiner—Brian M. Healy
Attorney, Agent, or Firm—Weingarten, Schurgin, Gagnebin & Hayes

[57] ABSTRACT

A system for aligning an optical fiber termination to a light path is disclosed. Light coming through the fiber at its termination as well as light introduced into the light path from a laser are directed along the light path to a viewer. The placement of the fiber termination is adjustable, as is the direction of the light path, such that the image of light from the optical fiber termination can be adjusted to coincide at the viewer with the image of light from the laser. A long focal length lens is optionally placed in the input beam path and laterally positioned as a fine resolution control over the point of focus at the fiber core. If the laser radiation is ultraviolet or infrared, a flourescing surface may be positioned in the light path to return visible light along the light path to the viewer.

34 Claims, 2 Drawing Sheets

GYROPTIC VISUAL COUPLERS

FIELD OF THE INVENTION

The present invention relates to optical fiber alignment techniques and in particular to aligning a fiber termination with respect to a light beam.

BACKGROUND OF THE INVENTION

This application is a continuation in part of commonly owned application Ser. No. 057,730, filed June 2, 1987, now abandoned, which is a continuation in part of commonly owned application Ser. No. 027,152 filed Mar. 17, 1987, now abandoned.

In many research and experimental facilities it is important to be able to align an optical fiber termination with a light path or another optical fiber termination for coupling radiation therebetween. While there exist various connector or coupler schemes for special applications and which provide for a preset alignment of fiber and light path or active devices, such special purpose elements do not lend themselves readily to the flexibility required in experimental and research applications. Alignment systems which have existed in the past for accomplishing flexible alignment of beams and fiber terminations have been awkward and required substantial time and effort to achieve a fiber alignment function.

In addition, in experimental applications, fibers are typically processed on the bench and cleaved by experimenters in order to provide the termination. Often times the quality of the termination, particularly as it relates to being able to accept radiation from a path into the fiber, is not always adequate. In addition, in launching radiation into a fiber it is often optimally achieved by placing the fiber termination at a point of focus and thus minimum waste size of the radiation in order to launch the maximum energy into the fiber itself. Further, often experiments require nonvisible light, such as infrared or ultraviolet laser radiation, to be aligned with the optical fiber. Such alignments necessitate the use of special complex viewers for viewing nonvisible radiation in the visible light range.

BRIEF SUMMARY OF THE INVENTION

According to the present invention an alignment system is provided in which an optical fiber termination and a light path can be rapidly and accurately aligned so that the light path represents a continuum of light passage into and out of the optical fiber core.

In a particular implementation, an optical fiber termination is placed into an X, Y, Z, $\theta$ positioner with its terminal end exposed in the direction of the light path. The light path is defined extending from the fiber termination to a viewing means, so that light traveling from the optical fiber passes along the light path to the viewing means where its image is visible. The light path is further defined by an objective lens to receive, for example, laser radiation of a large aperture and reduce it to a small aperture. The direction of the light path is optionally adjustable, to ease alignment with the fiber termination, by means of a long focal length lens adjustably positioned in the light path. Light introduced from the laser along the light path is selectively returned back through the lenses by, for example, a reflector and then directed by a beam splitter onto the viewing means, where its image is visible. The viewing means may be a screen typically having a targeting grid thereon or any eyepiece having a reticle within. The light representing the optical fiber termination is provided by a core illuminator placed at the opposite end of the optical fiber and the light exiting from the core similarly travels along the light path, through the objective lens and long focal length lens, and is projected by the beam splitter onto the viewing means. The beam splitter may have a dichroic coating to pass only infrared and ultraviolet light and reflect visible light.

The long focal length lens is positionally adjustable to adjust the direction of a portion of the light path, such that a large change in position of the lens results in a small change in position of the light path at the termination of the optical fiber. The X, Y, Z, $\theta$ positioner allows the fiber termination to be adjusted in directions orthogonal to the light path as well as along the light path in order to cause the image of the core to be projected into the same position as the reflected image of the light previously obtained from the reflector on the light path, assuring alignment. In order to place the fiber termination at the focus for the light on the light path, the reflector is adjustable in axial direction parallel to the light path so that it can be used to identify the position of focus from which the reflected light will appear as a minimal diameter on the projection screen. The optical fiber can then be placed with its termination at the same location after the reflector is retracted, ensuring the fiber will be coupling light from and to the light path at optimal efficiency.

In lieu of a selectively positioned reflector, a flourescing surface may be utilized along the beam path having a flourescing surface which returns lights of a visible wavelength along the light path in response to incident laser radiation of ultraviolet or infrared wavelength. The thus returned light is reflected out of the beam path by a dichroic mirror to a viewing screen or eye piece.

The alignment system of the present invention thus provides a rapid and efficieny alignment of an optical fiber termination to a light path by adjusting both the optical fiber termination and the light path. In addition, nonvisible radiation can easily be aligned to the fiber termination with no need for a complex nonvisible light viewer.

DESCRIPTION OF THE DRAWINGS

These and other features of the present invention are more fully set forth below in the solely exemplary detailed description and accompanying drawing of which.

DETAILED DESCRIPTION

The present invention contemplates a system for aligning an optical fiber termination and light path quickly and efficiently to ensure that light projected along the beam path will couple at optimal efficiency with the fiber to its termination.

Figure 1:
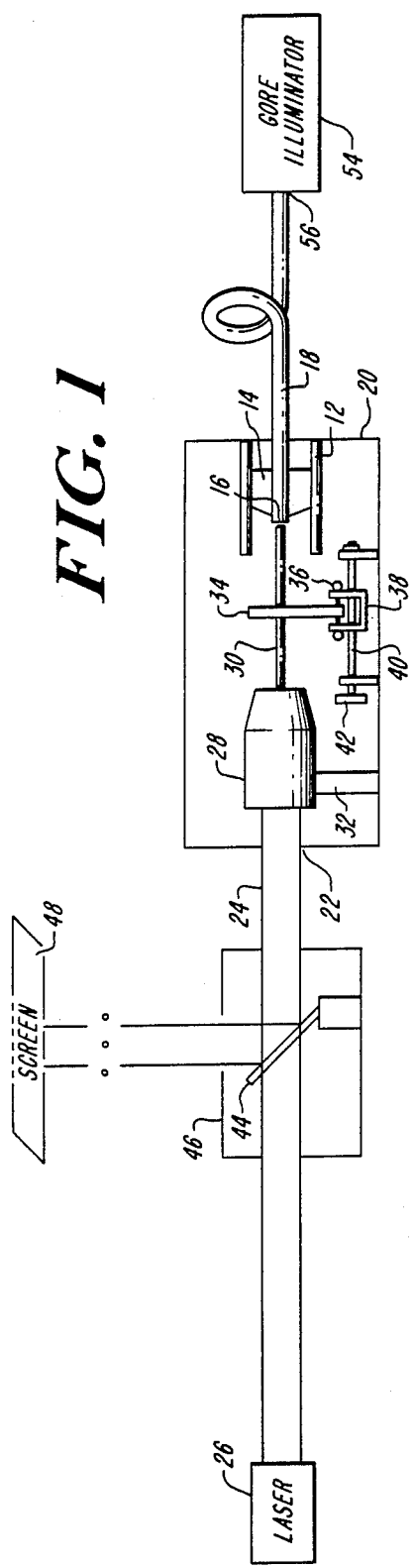
FIG. 1 is a pictorial and diagrammatic view of an alignment system according to the present invention.

FIG. 1 shows a diagrammatic and pictorial representation of the present invention in which a housing 10 is provided to encompass the alignment optics which comprise at one end an X, Y, Z, θ micrometer displacement positioner 12 in which a chuck 14 positions a termination 16 of an optical fiber 18. The positioner 12 is mounted at one end 20 of the housing 10 containing an aperture through which the fiber 18 passes. Adjustment in angle θ is an angular adjustment about the optical axis of the fiber termination.

Figure 5:
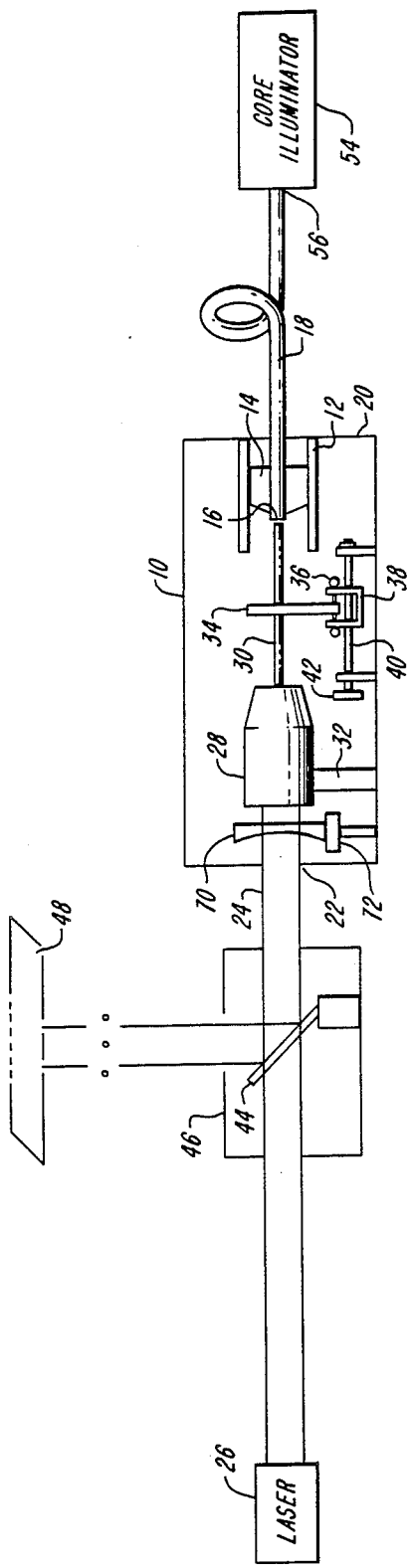
FIG. 5 is a diagrammatic view of a further modification.

The opposite end of the housing 10 contains a further aperture 22 adapted to receive a large aperture beam 24 of laser radiation, typically from a laser 26. In the modification shown in FIG. 5, the beam 24 enters the housing 10 and passes through long focal length lens 70 and objective lens 28. Lenses 70 and 28 define a light path 30. Lens 70 is adjustable by means of positioner 72 in directions othogonal to beam 24. A large positioning change of lens 70 provides a relatively smaller change in the position of light path 30 without changing its angle significantly. Lens 70 may be plano-concave or double concave. Beam 24 is reduced in waist size by an objective lens 28 to form a small aperture beam along light path 30. The resolution of adjustment of the light path is a function of the focal length of the long focal length lens and the objective lens. The objective lens 28 is supported within the housing 10 by any support means 32 convenient.

A means 34 for returning light along the light path is pivoted within the housing 10 by a hinge 36 on a bracket 38 which runs along an axial guide 40 providing adjustment of its axial position i.e., the direction parallel to the path 30, by a control 42. In this manner the location of the returning means 34 may be adjusted to different positions along the light path 30. The returning means 34 may be a mirror. Alternatively the returning means could be a flourescing surface responsive to incident ultraviolet or infrared radiation from the laser. The laser radiation stimulates the flourescing surface to flouresce with light in a visible wavelength. Suitable surfaces include screens Q-31, Q-32, Q-16, and U-21 manufactured by Quantex. By converting the returned radiation to visible light, the expense of a high cost ultraviolet or infrared viewing means 48 is avoided.

Figure 2:
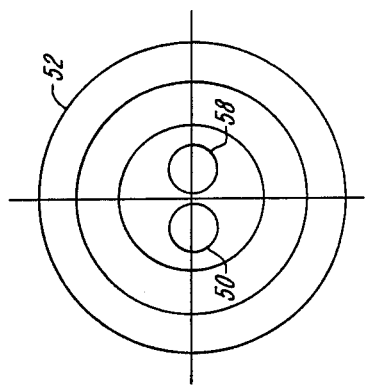
FIG. 2 is a representation of the projected image formed by the alignment system of FIG. 1.

Light from the returning means 34 returns on the light path 30 and on the path of the beam 24 to projection optics, typically a beam splitter 44 (where element 34 is a mirror) within a housing 46. The beam splitter 44 redirects the returned light and projects it onto a viewing means 48, which may be a screen surface with a grid pattern 52 (with or without an ultraviolet or infrared sensitivity) or an eyepiece containing a reticle. The returned light typically forms a spot 50 within grid pattern 52 as shown in FIG. 2. The beam splitter 44 may have a dichroic coating to transmit only the infrared or ultraviolet radiation coming from source 26 along path 24 and 30 and reflects converted visible light coming back from fluorescing surface 34 along path 30, 24 to viewing means 48.

A core illuminator 54 is provided and applies light to the core of the fiber 18 from an opposite end 56 thereof causing the core at the termination 16 to be illuminated. With the mirror or flourescing screen 34 placed out of the path 30, light from the core 16 is directed back along the light path 30 through the objective lens 28 to the beam splitter 44 and is similarly projected onto the screen 48 as a spot 58. Adjustment of the X, Y, Z, θ positioner 12 allows the spots 50 and 58 to be aligned with each other, thereby ensuring alignment of the light path 30 with the core of the fiber 18. An additional benefit from the system occurs from the fact that the quality of the cleavage from the fiber termination 16 can be determined by the appearance and the intensity of the projected spot 58.

In actual usage it is typically preferable to utilize the positioning control 42 to locate the mirror or flourescing surface 34 of the point of minimal beam width along the optical path 30 for light from the laser 26. This effectively places the mirror 34 at the focus of the illumination and is easily detected by minimal size for the spot 50 projected on the screen 48. The lens 70 is adjusted using positioner 72 to adjust the direction of the light path. The fiber termination 16, after the mirror or flourescing screen 34 is swung out of the beam path 30, is then typically positioned at the same location of focus in the beam path 30 using the X, Y, Z, θ positioner, and at the same time aligned for coincidence with the position of spot 50. Use of positioner 12 to align the fiber with the light path ensures not only that the fiber core at the termination 16 will be located and centered on the optical light path 30 but that the termination 16 will be placed at the focal point for light passing along the path of beam 24. This ensures optimal coupling efficiency between path 30 and fiber 18.

Figure 3:
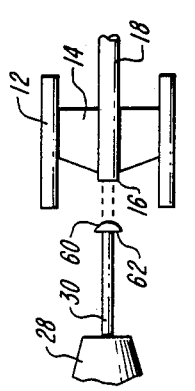
FIG. 3 is a diagrammatic view of a modification of the fiber alignment system of the present invention.

As illustrated in FIG. 3, the returning means 34 alternatively may be a lens 60 or thin piece of glass having a reflecting surface 62 serving the function of the mirror or flourescing screen 34 along the light path 30. The lens 60 will be transparent to the radiation from the core at the termination 16 and at the same time be at least partially reflective to light along the path 30 from the laser source 26, permitting the projection of both spots on the screen 48 as described above.

Figure 4:
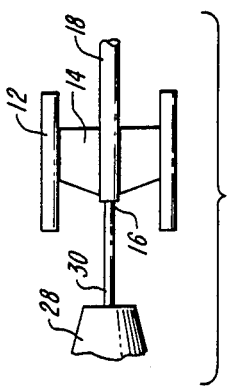
FIG. 4 is a diagrammatic view of a further modification.

In FIG. 4 there is illustrated the use of the termination 16 of the fiber 18 itself as the reflector for light on the beam path 30 allowing it to be projected from the beam splitter 44 onto the screen 48.

The thus described alignment system permits rapid and accurate alignment between a light source such as a laser and an optical fiber for optimal radiation transfer. The system can also be utilized, by duplication of parts on either end, for coupling fibers to each other. The particular structures illustrated above are intended as exemplary only, the scope of the invention being as defined solely in the following claims.

I claim:

1. A system for aligning a light path to an optical fiber comprising:
   means for adjustably positioning an optical fiber termination;
   means for defining a light path extending in a direction away from the optical fiber termination and the distal end of the optical fiber, the light path defining means including an objective lens;
   means for adjusting the location of a portion of the light path including a portion of the light path that originates at the optical fiber termination, the light path adjusting means comprising a second lens and means for moving the second lens to displace the portion of the light path wherein the path portion displacement is relatively less than the motion of the lens;
   viewing means interposed in the light path for viewing light traveling on the light path.

2. The alignment system of claim 1 wherein the second lens is a long focal length plano-concave lens.

3. The alignment system of claim 1 wherein the second lens is a long focal length double concave lens.

4. The alignment system of claim 1 wherein the means for adjustably positioning the fiber termination includes an X, Y, Z, θ positioner.

5. A system for aligning a light path to an optical fiber comprising:
 means for positioning an optical fiber termination;
 viewing means for viewing visible light;
 means for defining a light path originating at the optical fiber termination and terminating at the viewing means;
 means removably interposed in the light path for converting nonvisible radiation incident on said light path to visible light.

6. The alignment system of claim 5 wherein the converting means includes a means for receiving nonvisible radiation traveling in one direction along the light path and means for returning visible light in an opposite direction back along the light path to the viewing means.

7. The alignment system of claim 5 wherein the converting means includes a flourescing screen for receiving nonvisible radiation traveling in one direction along the light path and for returning visible light in an opposite direction back along the light path to the viewing means.

8. The alignment system of claim 5 further including a laser and means for introducing nonvisible laser radiation in a beam from the laser into the light path.

9. The alignment system of claim 8 wherein the means for defining a light path includes an objective lens responsive to the laser radiation introduced into the light path to reduce the aperture of the radiation.

10. The alignment system of claim 8 wherein the nonvisible laser radiation beam is ultraviolet radiation.

11. The alignment system of claim 8 wherein the nonvisible laser radiation beam is infrared radiation.

12. The alignment system of claim 5 wherein the viewing means includes an eyepiece and a reticle.

13. The alignment system of claim 5 wherein the viewing means includes a screen surface.

14. The alignment system of claim 5 wherein the light path defining means includes a beam splitter for directing the light path toward the viewing means.

15. The alignment system of claim 14 wherein the beam splitter includes a dichroic coating.

16. A system for aligning a light path to an optical fiber comprising:
 means for positioning an optical fiber termination;
 means for defining a light path extending away from said termination and the distal end of the optical fiber;
 means for providing a projected image of light at a location along said light path and of the fiber termination in an operator viewable form identifying the alignment of said light path with respect to said fiber termination, the projected image providing means comprising means for projecting on a surface light along said light path and light from said fiber termination and means for reflecting light on said light path back for projection on the surface from said light path when light on said light path fails to be aligned to strike said fiber termination.

17. The alignment system of claim 16 wherein said means for positioning said optical fiber termination includes an optical fiber chuck.

18. The alignment system of claim 16 wherein said means for defining a light path includes an objective lens responsive to laser radiation of a predetermined aperture for reducing said aperture to define said light path.

19. The system of claim 16 further including a laser for applying a laser radiation beam of said predetermined aperture to said objective lens thereby to provide light along said light path.

20. The alignment system of 19 wherein said means for projecting on a surface includes means responsive to radiation reflected along said light path through said objective lens for directing it away from said laser beam for projection on a screen whereby light reflected along said light path from said fiber termination is projected on said screen.

21. The alignment system of claim 20 wherein said light reflecting means includes a reflecting surface.

22. The alignment system of claim 21 wherein said reflecting surface includes a lens.

23. The alignment system of claim 21 wherein said reflecting means includes a mirror selectively positioned in said beam path between said objective lens and said fiber termination.

24. The alignment system of claim 16 wherein said reflecting means includes a lens.

25. The alignment system of claim 16 wherein said reflecting means includes a reflector selectively positioned in said light path.

26. The alignment system of claim 25 further including means for positionally adjusting said reflector in the direction of said light path.

27. The system of claim 16 wherein said projecting means includes means for illuminating the termination of said optical fiber from an opposite end thereof.

28. The alignment system of claim 27 wherein said illuminating means includes a core illuminator.

29. The alignment system of claim 16 wherein said means for providing relative positional adjustment includes means for adjusting the position of said fiber termination.

30. The alignment system of claim 29 wherein said means for providing adjustment of the fiber termination includes and X, Y, Z, O positioner.

31. The alignment system of claim 16 wherein said reflecting means includes a thin glass.

32. The alignment system of claim 21, wherein said reflecting surface includes a thin glass.

33. The alignment system of claim 5 wherein the converting means comprises a surface sensitive to ultraviolet radiation.

34. The alignment system of claim 5 wherein the converting means comprises a surface sensitive to infrared radiation.

* * * * *

UNITED STATES PATENT AND TRADEMARK OFFICE
CERTIFICATE OF CORRECTION

PATENT NO. : 4,850,668
DATED : July 25, 1989
INVENTOR(S) : Hosain Hakimi It is certified that error appears in the above-identified patent and that said Letters Patent is hereby corrected as shown below:

In Column 4, line 7, "of the point" should read --at the point--.

Signed and Sealed this

Thirtieth Day of June, 1992

*Attest:*

DOUGLAS B. COMER

*Attesting Officer*          *Acting Commissioner of Patents and Trademarks*